Patented July 8, 1924.

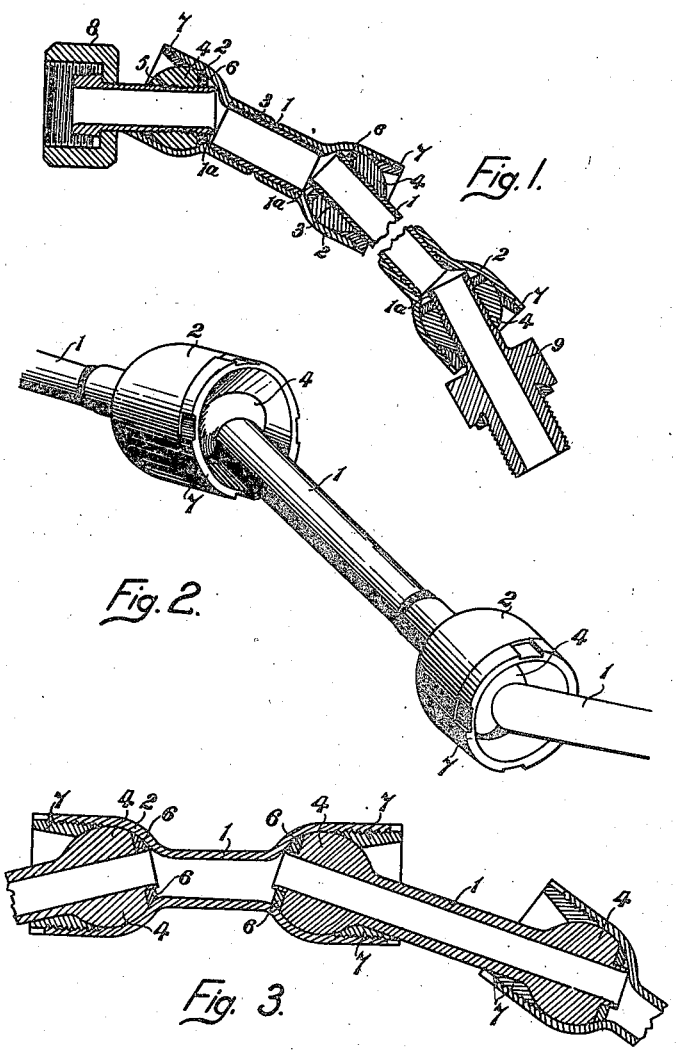

1,500,921

UNITED STATES PATENT OFFICE.

MOGENS LOUIS BRAMSON, JAMES HANSON, AND THOMAS BETHELL CALDWELL, OF STAFFORD, ENGLAND.

FLEXIBLE PIPE LINE.

Application filed June 21, 1919. Serial No. 305,817.

*To all whom it may concern:*

Be it known that we, MOGENS LOUIS BRAMSON, JAMES HANSON, and THOMAS BETHELL CALDWELL, subjects of His Majesty, the King of Great Britain, and residents of Stafford, in the county of Stafford, England, have invented certain new and useful Improvements in Flexible Pipe Lines, of which the following is a specification.

This invention relates to ball and socket joints particularly for flexible pipe lines and has reference to ball and socket joints wherein the ball member is provided with a packing ring and the parts are held in assembled position by an annular cap.

The object of our invention is to provide a pipe having flexible joints of the aforesaid general character which will be comparatively light in weight, will sustain considerable internal pressure without leakage or without its flexibility being unduly impaired, will be capable of being easily coiled for transport and which, moreover, will be comparatively easy and cheap of manufacture and durable in use. The primary feature of the present invention consists in forming the ball member of a portion only of a ball and providing a packing washer resting upon and forming an extension of the inner end of the ball member so that its area is directly subjected to the full pressure within the pipe. The invention further comprises a pipe line composed of rigid sections the joints between which consist of a socket carried by or forming part of one section and a part only of a sphere or ball carried by and forming part of another adjacent section and a leather or other packing washer which when in position forms an extension of the inner end of the ball member of the joint and is subjected to the pressure of the fluid within the pipe which operates to maintain it in position.

In the accompanying drawings we have illustrated a pipe constructed in accordance with and embodying the essential feature of our invention.

In these drawings Fig. 1 is a longitudinal section of a pipe line showing two of the joints between the sections, and Fig. 2 is a perspective view of a portion of a pipe line showing the joints between the pipe sections.

Referring to these drawings the numeral 1 designates the rigid pipe sections which are flexibly connected together by our special joints which comprise a cup or socket member 2 rigidly connected as by the screw connection 3 to the end of one of the sections 1 while a portion of a ball or sphere 4 for co-operation with this cup or socket 2 is rigidly secured, for instance, as by the screw connection 5 to the adjacent end of the next section, the end 1ª of the pipe section protruding through a hole in the ball or sphere member and forming a means for positioning a leather or like packing washer 6, a bearing ring 7 screwed into the end of the socket member 2 serving to keep the parts in position and provide adequate bearing surface for the ball or sphere member of the joint. The washer 6 is preferably an ordinary washer rectangular in cross section, but it will be seen from Fig. 1 of the drawings that when once pressed into its operative position in compressive engagement with the inner wall of the cup or socket its peripheral form conforms to that of the ball or sphere member 4 of the joint, and in effect this washer 6 forms an extension of the ball or sphere portion. It will be seen that in operation this washer is subjected to the full pressure of the fluid within the pipe which tends to maintain it compressed tightly in position. It will be understood that the ends of the pipe may be provided with more or less usual connection fitments such as the union nut 8 or screwed spigot 9.

What we claim and desire to secure by Letters Patent is:—

1. A flexible pipe comprising rigid pipe sections, a cup member disposed at the end of one section, a portion of a ball disposed at the adjacent end of the adjoining section having a flat inner end, a flat flexible and distortable washer of rectangular cross section disposed on said flat inner end and forming an extension of the ball portion said washer being open to the pressure in the pipe line, the adjacent rigid pipe section of the ball portion extending through said ball portion and constituting a spigot over which the said flat flexible distortable washer is positioned, and a bearing ring adapted to engage the open end of the cup member and force the ball member into operative engagement with the interior face of the cup member so that the peripheral edge of the flexible washer conforms to the curvature of such interior face.

2. A flexible pipe comprising rigid pipe sections, a cup member disposed at the end of one section, a portion of a ball disposed at the adjacent end of the adjoining section having a flat inner end, a flat flexible and distortable washer of rectangular cross section disposed on said flat inner end and forming an extension of the ball portion, said washer being open to the pressure in the pipe line, the adjacent rigid pipe section of the ball portion extending through said ball portion and constituting a projecting spigot over which the said flat flexible and distortable washer is positioned, and a bearing ring having a concave annulus conforming to the surface of the ball adapted to screw into the open end of the cup member and force the ball member into operative engagement with the interior face of the cup member so that the peripheral edge of the flexible washer conforms to the curvature of such interior face and the ball member including the washer cooperates with a containing cup formed by the inner surface of the cup member and the concave annulus of the bearing ring.

In witness whereof we affix our signatures.

MOGENS LOUIS BRAMSON.
JAMES HANSON.
THOMAS BETHELL CALDWELL.